(12) United States Patent
Jonsson

(10) Patent No.: US 8,422,889 B2
(45) Date of Patent: Apr. 16, 2013

(54) NOISE DETECTOR IN A LIGHT BULB

(75) Inventor: Karl Jonsson, Rancho Santa Margarita, CA (US)

(73) Assignee: Greenwave Reality, PTE Ltd., Singapore (SG)

( * ) Notice: Subject to any disclaimer, the term of this patent is extended or adjusted under 35 U.S.C. 154(b) by 272 days.

(21) Appl. No.: 12/883,596

(22) Filed: Sep. 16, 2010

(65) Prior Publication Data

US 2012/0070153 A1    Mar. 22, 2012

(51) Int. Cl.
*H04B 10/00* (2006.01)
*H04B 10/02* (2006.01)

(52) U.S. Cl.
USPC .......................... 398/172; 398/133

(58) Field of Classification Search .............. 398/172, 398/115, 132, 133, 182, 201; 315/312, 318, 315/307, 360, 291, 297, 169.1
See application file for complete search history.

(56) References Cited

U.S. PATENT DOCUMENTS

| | | | |
|---|---|---|---|
| 3,970,987 A | 7/1976 | Kolm | |
| 4,609,994 A * | 9/1986 | Bassim et al. | 702/39 |
| 6,492,897 B1 | 12/2002 | Mowery | |
| 6,812,970 B1 | 11/2004 | McBride | |
| 7,139,716 B1 * | 11/2006 | Gaziz | 704/275 |
| 7,455,435 B2 | 11/2008 | Mathews et al. | |
| 7,884,727 B2 * | 2/2011 | Tran | 340/573.1 |
| 7,923,943 B2 * | 4/2011 | Peker et al. | 315/312 |
| 7,956,546 B2 * | 6/2011 | Hasnain | 315/200 R |
| 8,013,545 B2 * | 9/2011 | Jonsson | 315/318 |
| 8,102,127 B2 * | 1/2012 | Melanson | 315/178 |
| 8,251,544 B2 * | 8/2012 | Ivey et al. | 362/276 |
| 2003/0197807 A1 | 10/2003 | Wu | |
| 2004/0260407 A1 * | 12/2004 | Wimsatt | 700/19 |
| 2009/0040030 A1 | 2/2009 | Mathews et al. | |
| 2009/0059602 A1 | 3/2009 | Santos et al. | |
| 2010/0084992 A1 | 4/2010 | Valois et al. | |
| 2010/0141153 A1 | 6/2010 | Recker et al. | |
| 2011/0062874 A1 | 3/2011 | Knapp | |
| 2011/0309735 A1 | 12/2011 | Parker et al. | |
| 2012/0126699 A1 | 5/2012 | Zittel et al. | |

FOREIGN PATENT DOCUMENTS

| | | |
|---|---|---|
| JP | 2001-307505 A | 11/2001 |
| JP | 2006-525640 A | 11/2006 |
| JP | 2008-123727 A | 5/2008 |
| KR | 10-2002-0034855 A | 5/2002 |
| WO | 03-026358 A1 | 3/2003 |

OTHER PUBLICATIONS

K. Jonsson, "Modular Networked Light Bulb," GWRPID-002A, Unpublished U.S. Appl. No. 12/795,395, filed Jun. 7, 2010.
Non-Final Office Action for U.S. Appl. No. 13/195,655, USPTO, Jun. 21, 2011.
Jonssson, Karl, Modular Networked Light Bulb, Unpublished U.S. Appl. No. 13/195,655, filed Aug. 1, 2011.
Jonssson, Karl, Preliminary Amendment to U.S. Appl. No. 13/195,655, filed Aug. 1, 2011.

(Continued)

*Primary Examiner* — Dalzid Singh
(74) *Attorney, Agent, or Firm* — Bruce A. Young

(57) ABSTRACT

Noise may be received through a microphone included in a lighting apparatus. The noise may then be analyzed to determine if a human being may have been the source of the noise, and a message sent over a network alerting other devices that a human-caused noise was detected.

21 Claims, 5 Drawing Sheets

OTHER PUBLICATIONS

Written Opinion of the International Searching Authority (WO/ISA) for PCT/US2010/053079, Korean Intellectual Property Office, Jan. 6, 2011, Including the International Search Report with Patent Family Annex.

Notice of Allowance for U.S. Appl. No. 12/795,395, USPTO, Jul. 22, 2011.

Notice of Allowance for U.S. Appl. No. 13/195,655, USPTO, Dec. 17, 2012.

* cited by examiner

NOISE DETECTOR IN A LIGHT BULB

BACKGROUND

1. Technical Field

The present subject matter relates to lighting apparatus, especially lighting fixtures and light bulbs. It further relates to the ability to monitor room noise through a home network.

2. Description of Related Art

In the past, most lighting systems used incandescent or florescent light bulbs for illumination. As light emitting diode (LED) technology improves, it is being used more and more for general illumination purposes. In many cases, LED based light bulbs are a direct replacement for a traditional incandescent or florescent light bulb and do not include any other functionality. In some cases, however, additional functionality is included with a lighting apparatus.

Light emitting diodes (LEDs) were originally developed to provide visible indicators and information displays. For such luminance applications, the LEDs emitted relatively low levels of light. However, in recent years, improved LEDs have become available that produce relatively high intensities of light output. These higher power LEDs, for example, have been used in arrays for traffic lights. Today, LEDs are available in almost any color in the color spectrum.

Providing home automation functionality using networking is well known in the art. Control of lighting and appliances can be accomplished using systems from many different companies such as X10, Insteon® and Echelon. Other devices have been marketed that include video cameras or speakers into a lighting apparatus.

SUMMARY

A lighting apparatus may include a visible light source or a socket capable of powering accepting a light source. It may also include a controller with a data transmitter and an acoustic energy detector with its output connected to the controller. The apparatus may also have structure to couple the visible light source with the controller. The controller may send data through the data transmitter disclosing that a noise has been detected in response to acoustic energy received by the acoustic energy detector.

A method for detecting noise in a room may have a lighting apparatus receive acoustic energy, where it may be analyzed to determine if a human being caused the acoustic energy. The lighting apparatus may send a message over a network in response to the acoustic energy caused by the human being.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

The term "LED" refers to a diode that emits light, whether visible, ultraviolet, or infrared, and whether coherent or incoherent. The term as used herein includes incoherent polymer-encased semiconductor devices marketed as "LEDs", whether of the conventional or super-radiant variety. The term as used herein also includes semiconductor laser diodes and diodes that are not polymer-encased. It also includes LEDs that include a phosphor or nanocrystals to change their spectral output.

The term "visible light" refers to light that is perceptible to the unaided human eye, generally in the wavelength range from about 400 to 700 nm.

The term "white light" refers to light that stimulates the red, green, and blue sensors in the human eye to yield an appearance that an ordinary observer would consider "white". Such light may be biased to the red (commonly referred to as warm color temperature) or to the blue (commonly referred to as cool color temperature).

The term "network" refers to a communication path between two or more devices using a previously determined protocol for communication. The network may be based on standards or may be proprietary to a particular embodiment. It may use a variety of physical media, including but not limited to, radio frequency propagation through the air, wire connections, optical communication through the air or through optical fiber, signals coupled to electrical power lines, and magnetically coupled communication.

The terms "acoustic energy," "sound waves," "sound," and "noise" all refer to pressure waves propagating through matter. The matter may be in a solid, liquid or gaseous state. Although the frequency range detectable by the human ear is generally from about 20 Hz to about 20 kHz, the frequency of the pressure waves referred to by these terms may range from just above 0 Hz to the megahertz range and should not be limited to the range of human hearing unless the context implies such.

Reference now is made in detail to the examples illustrated in the accompanying drawings and discussed below.

Figure 1:
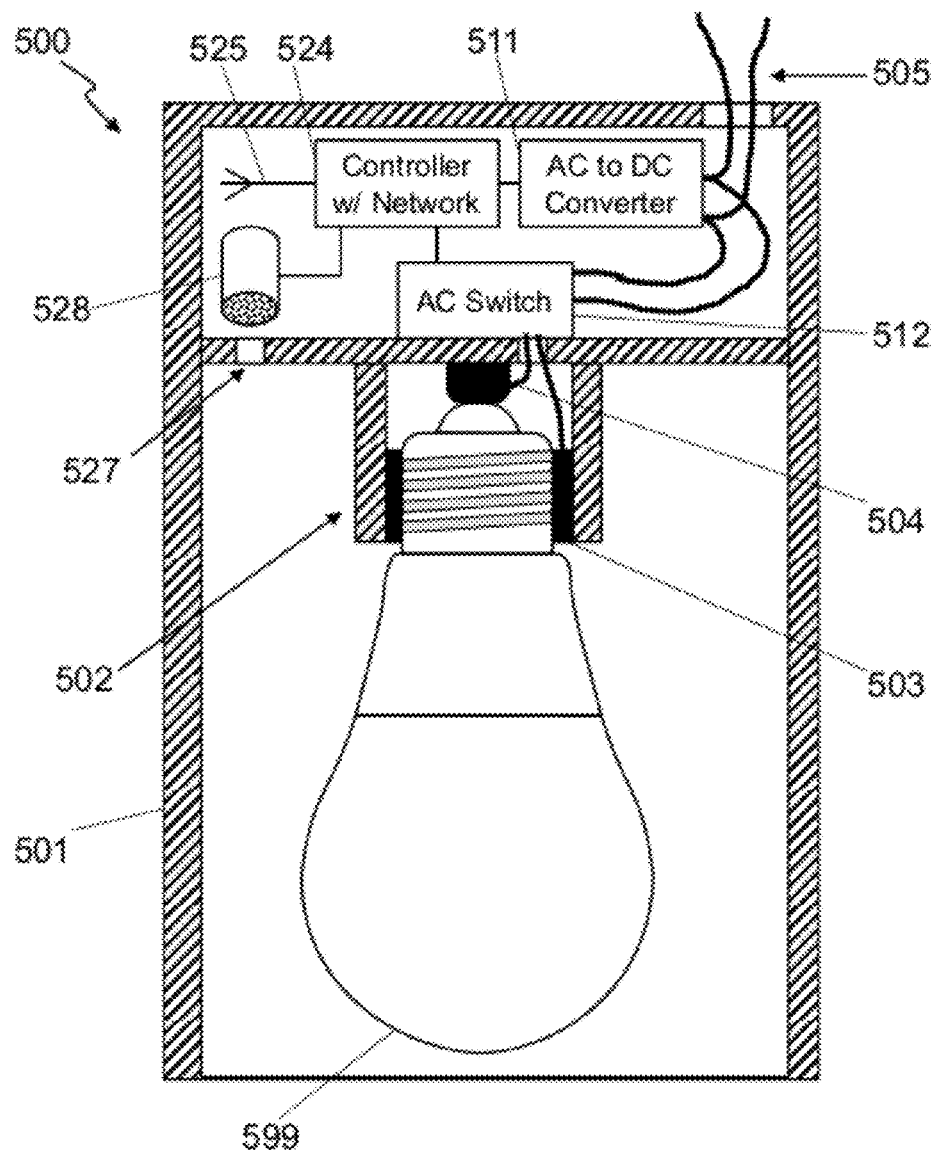
FIG. 1 show a cross-sectional view of an embodiment of a lighting apparatus.

FIG. 1 shows a cross-sectional view 500 of an embodiment of a lighting apparatus. In the embodiment shown, a structure 501 may be in place to couple the various pieces of the lighting apparatus into a single unit. A socket 502 may be included in some embodiments, with contacts 503, 504, to accept a separate light bulb 599 or lighting module as a visible light source. In some embodiments this may be a socket for an Edison screw type base such as an E26 or E27 other standard lamp socket. In other embodiments, the visible light source may be integrated into the lighting apparatus 500, and may not intended for user replacement separately from the lighting apparatus. The lighting apparatus 500 may be intended as an illumination device, so a minimum light output of 25 lumens, or the light output equivalent to a 5 W incandescent bulb, may be provided in many embodiments. The structure 501 may provide access for electrical wiring 505 to enter the structure allowing alternating current (AC) power or direct current (DC) to enter the fixture. Voltages that may be received from the electrical wiring 505 include common household voltages of 100-250 Volts AC (VAC) at 50 or 60 Hz although other AC or direct current (DC) voltages may be used in some embodiments. Some embodiments may include a battery, fuel cell, or other power generation module so that no external power connection is required.

The AC voltage from the wires 505 may be connected to an AC to DC converter 511 that generates voltages suitable for powering electronics components. In some embodiments, the AC to DC converter 511 may also generate voltages suitable to power LEDs or other light emitting sources. A controller 524 with a network adapter may be included in the lighting apparatus 500. It may receive power from the AC to DC converter 511 and the network adapter in the controller 524 may connect to an antenna 525 to allow it to connect to a wireless network. In other embodiments, a different type of data connection may be used. The structure 501 may have an opening 527 to allow acoustic energy, (i.e. sound or noise) from outside the lighting apparatus 500 to reach an acoustic energy detector such as the microphone 528. Other embodiments may utilize different devices, such as a piezo-electric bimorph as the acoustic energy detector or other type of acoustic energy detector. The microphone 528 may have an output connected to the controller 524 so that the controller can receive data representing the acoustic energy for processing. The controller 524 may then determine whether or not to send a message through the antenna 525, across the network, to indicate that acoustic energy was received. Some embodiments may not include a way for the controller to control the light emitting source but in others, the controller 524 may also have an output controlling an AC switch 512 that may control whether power from the wires 505 may reach the contacts 503, 504 of the socket 502. This may allow the controller 524 to control the on-off state of the light bulb 599. In embodiments may have a DC switch if the light emitting source uses DC power and in other embodiments the controller may directly drive the light emitting source.

Figure 2:
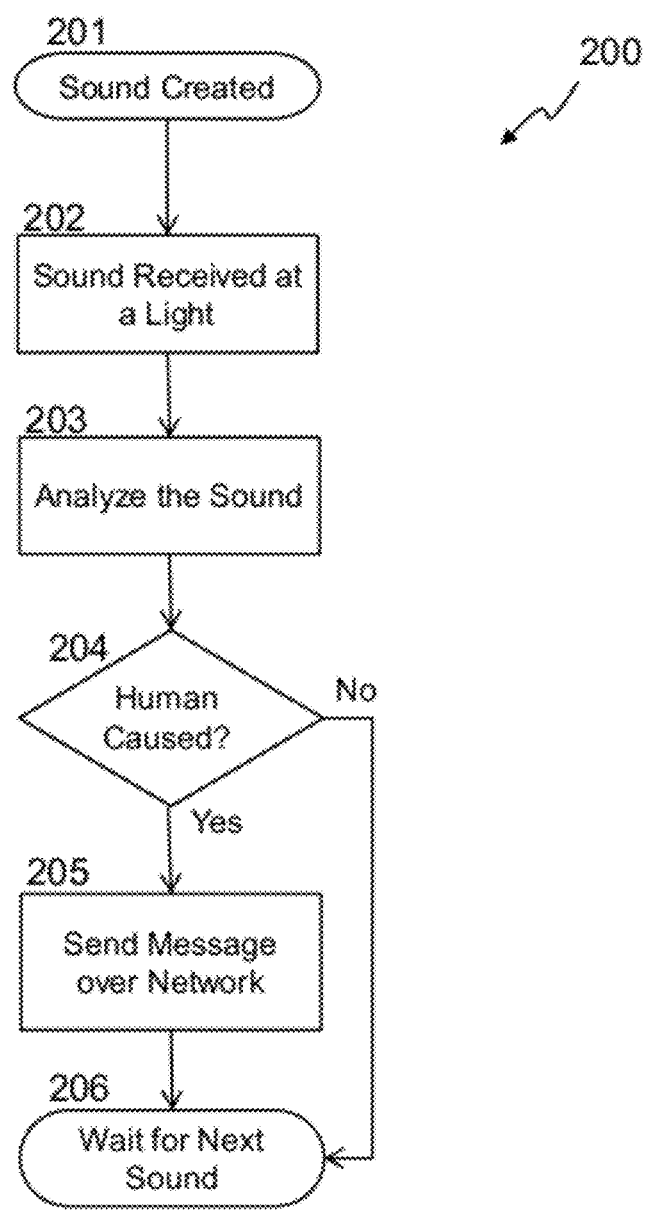
FIG. 2 is a flow chart of an embodiment to detect noise made by a human being using a light bulb.

FIG. 2 is a flow chart 200 of an embodiment to detect noise made by a human being. A sound (or noise) may be created at block 201 and may propagate to a lighting apparatus with an embodiment of a noise detector where it may be received by an acoustic energy detector in the lighting apparatus in block 202. The controller may receive data about the noise from the acoustic energy detector in the light (e.g. light bulb, light fixture, or other lighting apparatus) and analyze the sound at block 203. In one embodiment, the controller may measure a duration of the noise and/or the absolute sound pressure level of the noise. In other embodiments, the controller may measure the relative sound pressure level of the noise compared to the background noise. The controller may utilize this information to determine that a human being was likely to be the cause of the noise. In some embodiments, the controller may decide that a noise with a duration between about 1 and 5 seconds with an absolute magnitude of greater than 70 dB may likely be caused by human activity. Other embodiments may determine that an average sound pressure level of between about 55 and 75 dB for a duration of over 20 seconds may be indicative of human speech. Other embodiments may look at the rise time or fall time of the noise level or other aspects of the amplitude envelope to identify specific noise events such as a door closing or footsteps.

Yet additional embodiments may measure spectral content of the noise using such techniques as fast Fourier transforms (FFT), discrete Fourier transforms (DFT), applying different frequency filters, or other techniques, for determining frequency content of the data representing acoustic energy. In some embodiments, the controller may determine that a human voice is the source of the noise if the largest single component of the acoustic energy of the noise is between about 100 and 300 Hz. Other embodiments may utilize more sophisticated techniques using the spectral content to identify human voice characteristics such as comparing spectral patterns to templates. Some embodiments may utilize trained or untrained speech recognition algorithms or speaker recognition algorithms. A wide variety parameters of the acoustic energy may be sampled and/or measured and a wide variety of algorithms may be used, simplistic or complex, to analyze the acoustic energy in different embodiments to determine whether or not the noise was likely caused by human activity.

If it is determined that the noise was not caused by human activity at block 204, the lighting apparatus may simply wait for the next sound at block 206. If it is determined that the noise was likely to have been caused by human activity at block 204, a message may be sent over the network at block 205. Other embodiments may be configured to detect other types of noise, such as glass breaking, water running, a car motor, a shower running, or other noises. The message may take many different forms in different embodiments. In some embodiments the message may simply be broadcast by the lighting apparatus for any other device to receive. In other embodiments, the message may be targeted to a specific entity, such as a home network controller, a lighting controller, a security system controller, a home automation controller, or other central agent. In other embodiments, the message may be targeted to another lighting apparatus or other piece of home automated equipment. The content of the message may also be different in different embodiments. In some embodiments, the message may simply be a notification that a noise has been detected. In other embodiments, the noise itself may be captured and sent over the network as an uncompressed stream of digital data or it may be compressed using such techniques as motion picture experts audio layer 3 (MP3), advanced audio coding (AAC), or other standard or proprietary audio compression algorithms. If speech recognition was used, the message may consist of the word or phrase that was recognized, and if speaker recognition was used, the message may identify the speaker. The message may have a wide variety of different content in different embodiments, depending on what the particular embodiment requires to achieve its objectives. The controller may take other action as well when a noise is detected, such as turning on or turning off the light, in addition to sending the message over the network. Other embodiments may continually stream a rendition of the acoustic energy received across the network whenever the level is above a minimum level, which may serve as a notice that a noise has been received. In any case, after the message is sent, the lighting apparatus may then wait for the next noise at block 206. While the embodiments disclosed herein address implementing the noise detection method in a lighting apparatus, other networked devices, such as smart thermostats, display panels, smart power strips, or other networked device could also include similar functionality.

Figures 3A, 3B:
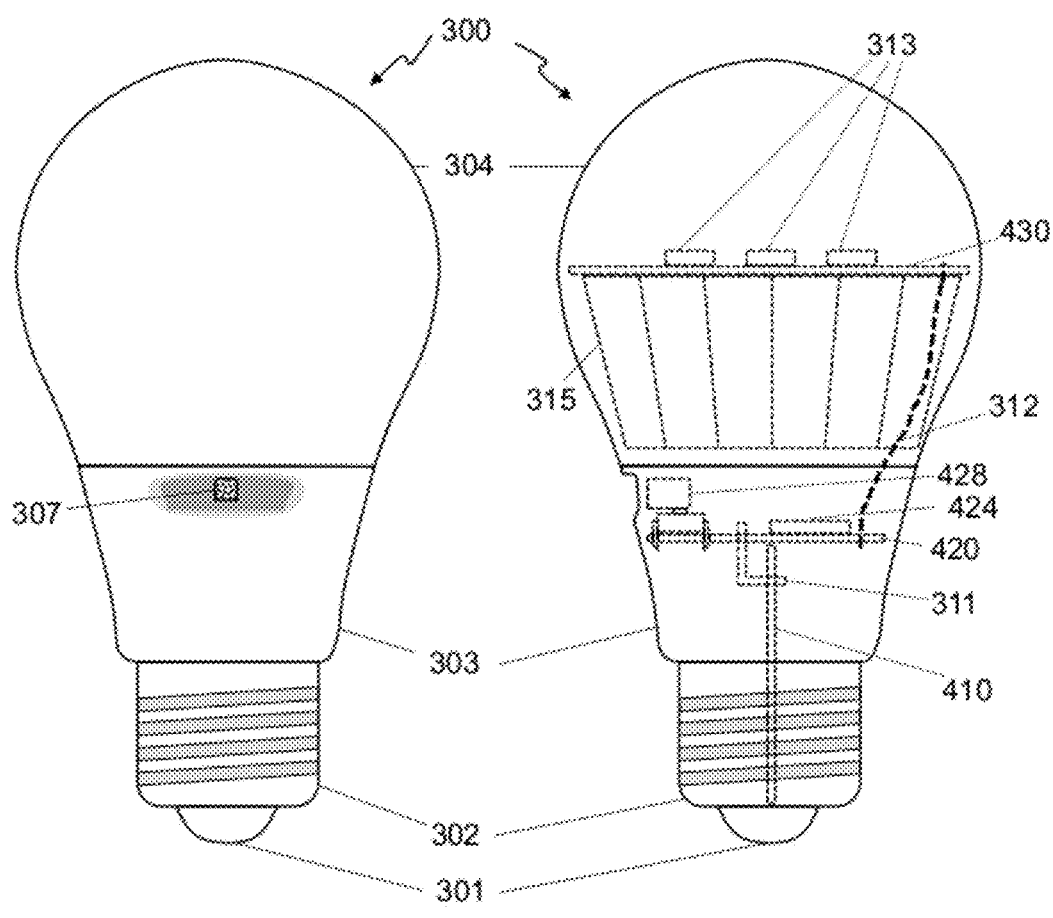
FIGS. 3A and 3B show two views of an embodiment of a noise detecting networked light bulb.

FIG. 3A shows a front view (with inner structure not shown) and FIG. 3B shows a side view (with selected inner structure shown in broken lines) of an embodiment of a networked light bulb 300 with noise detector. Other embodiments may have similar or very different construction from the embodiment shown. The light bulb 300 shown, is AC powered but other embodiments could be DC powered, battery powered or solar powered. The networked light bulb 300 of this embodiment has a base with a power contact 301 and a neutral contact 302, a middle housing 303 and an outer bulb 304 (i.e. shell). Each piece 301, 302, 303, 304 can be made of a single piece of material or be assembled from multiple component pieces. In some embodiments, the power contact 301 and the neutral contact 302 are situated on an Edison screw fitting base as shown to allow the light bulb to be screwed into a standard light socket. The outer bulb 304 is at least partially transparent and may have ventilation openings in some embodiments, but the other pieces 301, 302, 303 can be any color or transparency and be made from any suitable material. The middle housing 303 may have an aperture 307 to allow acoustic energy to enter the bulb. A microphone 428, or other acoustic energy detector, may be mounted on a networked controller circuit board 420 and situated to receive acoustic energy through the aperture 307. The networked controller circuit board 420 with the microphone 428 and microcontroller 424 may be mounted horizontally and a LED driver circuit board 410 may be mounted vertically in the base of the networked light bulb 300. A board-to-board connection 311 may be provided to connect selected electrical signals between the two circuit boards 410, 420. A LED board 430 may have one or more LEDs 313 mounted on it and may be backed by a heat sink 315 to cool the LEDs 313. In some embodiments the LED board 430 may be replaced by a single multi-die LED package or a single high output LED. In some embodiments the heat sink 315 may not be needed or could have a different configuration than what is shown. A cable 312 may connect the networked controller circuit board 420 with the LED board 430 and carry the power for the LEDs 313. In some embodiments it may connect the LED driver circuit board 430 directly to the LED board 410 instead of passing the signals through the networked controller circuit board 420.

Figure 4:
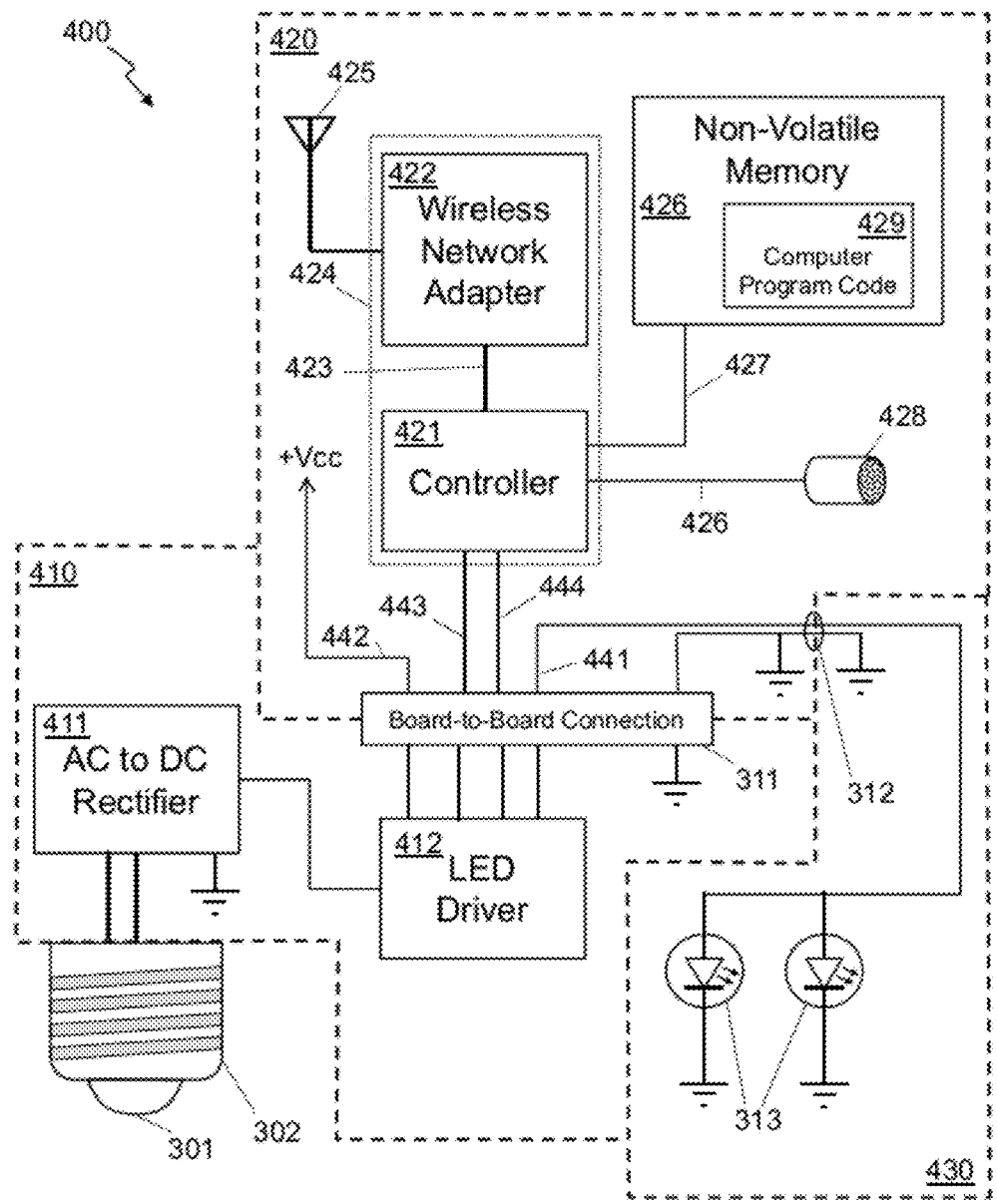
FIG. 4 shows a block diagram of the electronics utilized in an embodiment of the noise detecting networked light bulb.

FIG. 4 shows a block diagram of the control electronics 400 that may be used in the networked light bulb 300. While the following discussion directed primarily at the embodiment of a networked light bulb 300 the same principles and concepts can be applied by one skilled in the art to other embodiments. The block diagram is divided into three sections 410, 420, 430 corresponding to the three printed circuit boards of FIG. 3. Other embodiments may partition the system differently and have more or fewer printed circuit boards or circuit elements. The three sections are the LED Driver board 410, the networked controller board 420, and the LED board, The base with contacts 301, 302 may provide AC power to the AC to DC rectifier 411 to power the LED driver 412. The LED driver may be an integrated circuit such as the NXP SSL2101 or similar parts from Texas Instruments or others. Several signals are shared in common between the LED driver section 410 and the networked controller section 420 through a board-to-board connection 311. The board-to-board connection 311 may be a pin and socket connector system, an edge finger connector system, soldered right angle pins, a cable, or any other method of connecting two boards. The shared signals may comprise a ground connection, the LED power signal 441, a regulated power voltage 442, a control signal 443 and a serial communication signal 444. In some embodiments, the regulated power voltage 442 may be sufficient to power all the electronics in the networked controller section 420. In other embodiments, where more power is needed, a DC to DC converter may be included in the networked controller section 420 running off the LED power signal 441. The ground signal and the LED power signal 441 are then sent from the networked controller section 420 to the LED section 430 over cable 312. The LED section 430 may have a plurality of LEDs 313 powered by the LED power signal 441. The LED driver section 410 and LED section 430 could correspond to other sections that transform and consume electrical power or perform operations of a different embodiment of a lighting apparatus.

The networked controller section 420 may have a wireless network adapter 422 that receives radio frequency signals through antenna 425 and is connected to controller 421 by a digital bus 423. In some embodiments, the wireless network adapter 422 may connect to a Z-wave, Zigbee (IEEE 802.15.4) or other wireless mesh network, or Wi-Fi (IEEE 802.11), or other wireless network. Other embodiments may use a wired or power line network adapter instead of a wireless network adapter. In some embodiments, the controller 421 is implemented as a microcontroller and in some embodiments, the controller 421, wireless network adapter 422, and digital bus 423 may be integrated onto a single chip 424 such as the Zensys ZM3102. In some embodiments a timer or clock function is included in the networked controller board 420. A non-volatile memory 426 also may be included on the networked controller board 420. The non-volatile memory 426 may be a flash memory, an EPROM, a battery-backed up RAM, a hard drive, or any other sort of memory device that retains its contents through a power cycle. The non-volatile memory 426 can be implemented as a single integrated circuit, a set of integrated circuits, a block of memory cells integrated with another function such as the controller 421 or the wireless network adapter 422 or other implementation. The non-volatile memory 426 is connected to the controller through a digital connection 427. The digital connection could be an I2C bus, an SPI bus, a parallel connection, an internal bus within an integrated circuit, or any other electrical connection, using a standard or proprietary protocol. Computer program code 429 may be included in the non-volatile memory 426. The computer program code 429 may be executable by the controller and may implement one or more functions of an embodiment.

A microphone 428 may be included on the networked controller board 420 and have its output 426 connected to the controller 421. The output 426 may be a digital output in some embodiments that can be directly sampled by the controller 421 but in many embodiments, the output 426 may be an analog voltage. In some embodiments, the analog output 426 may need amplification or other processing before being sent to an analog to digital converter (ADC) capable of creating digital data that can be processed by the controller. The ADC may be implemented as a separate integrated circuit or it could be integrated into the controller 421 or the microphone 428. In some embodiments, a different type of acoustic energy detector, such as a piezo-electric bimorph may be used that may have different requirements for interfacing to the controller.

In some embodiments, the controller 421 may control the brightness of the plurality of LEDs 313 by driving the control signal 443 back to the LED driver 412. In one embodiment the controller 421 may simply drive the control signal 443 low to turn the plurality of LEDs 313 on and drive the control signal 443 high to turn the plurality of LEDs 313 off. In other embodiments, the controller 421 may drive the control signal 443 with a pulse-width modulated signal to control the brightness of the plurality of LEDS 313. In some embodiments, the LED driver section 410 is designed to accept power that has been controlled by a standard thyristor-based light dimmer which varies the phase where the AC power is active. This can interact with the dimming control taking place over the network. To determine the current dimming level of the LEDs 313, the networked controller section 420 may, in some embodiments, include circuitry to monitor the LED power signal 441 to determine the amount of dimming taking place. In other embodiments, the controller 421 may communicate with the LED driver 412 over the serial communications signal 444 to query and perhaps override the current dimming level. The serial communication signal 444 may also be used to communicate the current operating condition of the networked light bulb 300, actual measured power used if the additional circuitry to measure power is included in the networked light bulb 300, color temperature control, device temperature information or any other status or control information that might need to be communicated between the controller 421 and the LED driver 412 in a particular embodiment. The serial communication signal 444 may be implemented with a unidirectional or a bidirectional communication protocol such as RS-232, I2C, USB, SPI or any other standard or proprietary protocol. In some embodiments, it may be a multi-pin communication link utilizing serial or parallel communication protocols. As an illumination source, the luminous flux output of the LEDs 313 should be at least equivalent to a 5 W incandescent light, or 25 lumens or greater. In one embodiment, the LEDs 313 may be a plurality of red, green and blue LEDs. In another embodiment, the LEDs 313 may be one or more white light LEDs. In other embodiments, the LEDs 313 could be any combination of LEDs, an incandescent light, a fluorescent light or any other type of light emitting device. The controller 421 and/or LED driver 412 may, in some embodiments, control the LEDs 313 to change the color temperature of the white visible light and/or the perceived color of the visible light.

Figure 5:
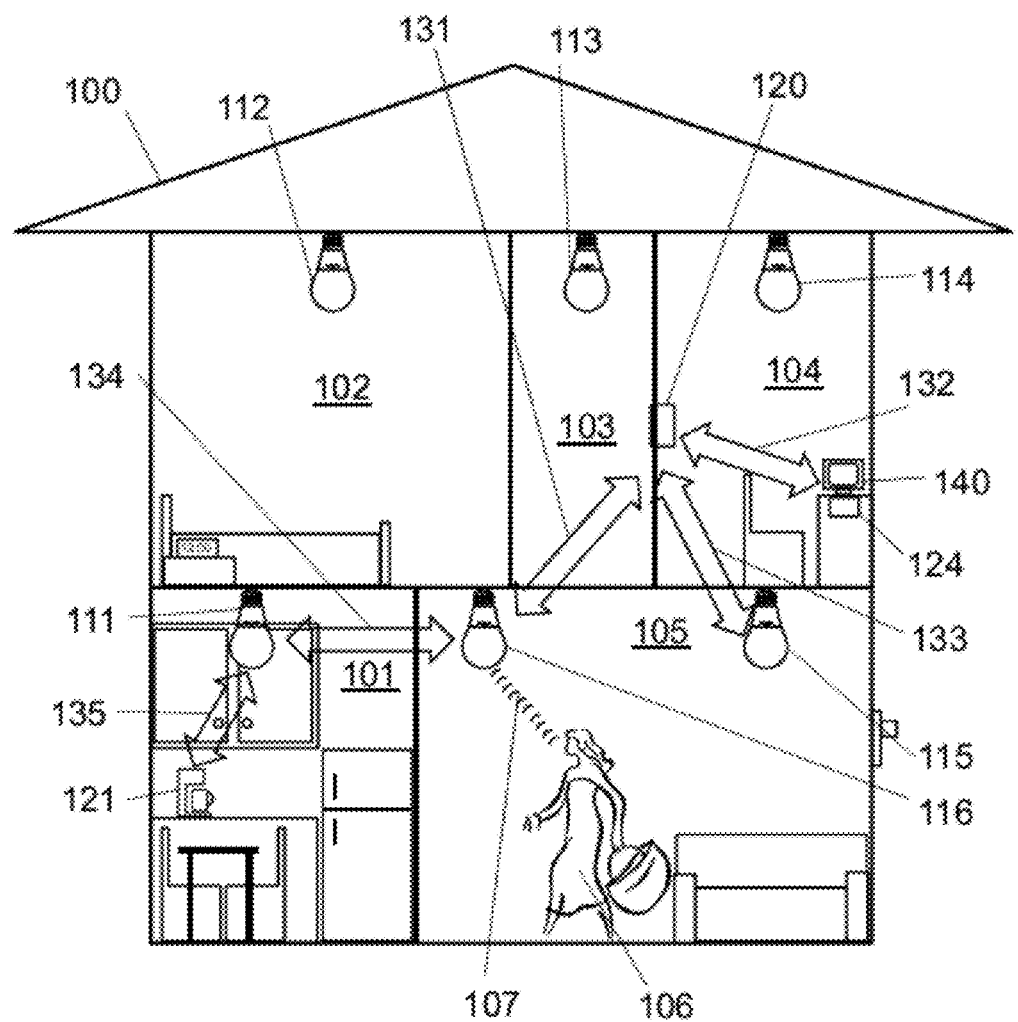
FIG. 5 shows a stylized view of a home with a plurality noise detecting networked light bulbs.

FIG. 5 shows a stylized view of a home 100 with a plurality of networked lighting apparatus 111-116. In the embodiment shown, the networked devices communicate over a wireless mesh network such as Z-wave or Zigbee (IEEE 802.15.4). The networked lighting apparatus 111-116 may implement the Multilevel Sensor Command Class if they use a Z-wave network or, if Zigbee is used, they may implement the appropriate sensor cluster within the Home Automation profile of Zigbee. Other wireless networks such as Wi-Fi (IEEE 802.11) might be used in a different embodiment. In other embodiments, a power line network such as X10 or HomePlug may be used. In additional embodiments, a wired network could be used such as Ethernet (IEEE 802.3). In other embodiments, an optical network or a wired network might be employed and some embodiments may utilize a heterogeneous network with multiple types of networks. This exemplary home has five rooms. The kitchen 101 has a networked light fixture 111 and a networked coffee pot 121. The bedroom 102 has a networked light fixture 112, and the hallway 103 has a networked light bulb 113. The home office 104 has a networked light bulb 114, a network controller 120, and a home computer 140 connected to a network gateway 124. The living room 105 has two networked light bulbs 115, 116. Homeowner 106 has just returning to her home and makes some noise 107 such as closing the door, dropping her keys on a table, or speaking.

The noise 107 propagates to a networked light bulb 116 with a noise detector which analyses the noise 107 and determines that the noise 107 was probably caused by a human being. Other embodiments may be configured to detect other types of noise, such as glass breaking, water running, a car motor, a shower running, or other noises that may not be caused by a human being. Once it has determined that the noise 107 was caused by a human being, the lighting apparatus 116 may send a message indicating such on the wireless mesh network over link 131 to the network controller 120 which may relay the message over network link 132 through the network gateway 124 to the home computer 140 which may be running a home automation program. The program may then determine that since a human is in the living room 105, it should turn on the lights in the living room 105, so the computer 140 then sends a message through the network gateway 124, network link 132, the network controller 120 and network link 131 and network link 133 to the network light bulbs 116, 115 in the living room 105, telling them to turn on. The computer 140 may have been previously configured to turn on the coffee pot 121 as soon as the owner arrives home, so it sends a message through the network gateway 124, network link 132, network controller 120, network link 131, light bulb 116, network link 134, light bulb 111 and network link 135 to the coffee pot 121 telling it to turn on and begin brewing coffee.

Home automation systems may utilize the information provided by various embodiments for a variety of purposes. One example might be to have an embodiment in the garage that detects the sound of a garage door opener to initiate action based on the homeowner returning home. Another example might be to have an embodiment a bathroom that detects the sound of a shower running and the home automation system may then turn on an exhaust fan in response. Another example might be to have an embodiment that is configured to detect the sound of glass breaking and can then report that information to a home security system.

Some home automation systems may also have access to data from a variety of other sensors around the home that they may utilize in conjunction with the information from various embodiments to determine which actions to take. One example may be to utilize noise patterns detected from various embodiments with data from non-intrusive load monitoring (NILM) sensors that monitor electrical characteristics of various electrical devices. The combination of those two sets of sensor data may allow various conclusions to be drawn by the home automation system, such as determining what activity the human is engaging in, and using that determination to take action to save energy or add to the convenience of the human being. Once the combined information has been used to identify the activity, some embodiments may then be able to identify the same activity in the future based on the noise pattern alone. In other cases, the home automation system may utilize data from a variety of sources in an integrated manner. An example of this might be using noise detection from various embodiments along with motion detection devices, and NILM sensors to track the movements of people from location to location within the home so that appropriate action can be taken, such as turning lights on and off, opening and closing drapes, turning off a television, or other actions.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "an LED" may refer to a single LED, two LEDs or any other number of LEDs. As used in this specification and the appended claims, the term "or" is generally employed in its sense including "and/or" unless the content clearly dictates otherwise.

Any element in a claim that does not explicitly state "means for" performing a specified function, or "step for" performing a specified function, is not to be interpreted as a "means" or "step" clause as specified in 35 U.S.C. §112, ¶6. In particular the use of "step of" in the claims is not intended to invoke the provision of 35 U.S.C. §112, ¶6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A lighting apparatus comprising:
   a visible light source capable of outputting 25 lumens or more of luminous flux;
   a controller comprising a data transmitter;
   an acoustic energy detector with an output, wherein the output is communicatively coupled to the controller; and
   structure to couple the visible light source with the controller;
   wherein the controller is configured to:
      perform speech recognition on acoustic energy received by the acoustic energy detector;
      determine that a human being caused the acoustic energy if a word is recognized;
      create a message based on the recognized word;
      send the message through the data transmitter in response to the determination that the acoustic energy received by the acoustic energy detector was caused by the human being.

2. The lighting apparatus of claim 1, wherein the visible light source comprises at least one LED.

3. The lighting apparatus of claim 1, wherein the data transmitter is communicatively coupled to an antenna and the data transmitter modulates a radio frequency carrier and the modulated carrier is transmitted from the antenna.

4. The lighting apparatus of claim 3, wherein the data transmitter participates in a wireless mesh network.

5. The lighting apparatus of claim 1, wherein the data transmitter modulates a carrier and the modulated carrier is coupled to a power line.

6. The lighting apparatus of claim 1, wherein the controller further comprises circuitry to control an on-off state of the visible light source.

7. The lighting apparatus of claim 1, wherein the acoustic energy detector is a microphone, and the message comprises a representation of the acoustic energy received by the microphone.

8. The lighting apparatus of claim 7, wherein said representation comprises a compressed rendition of the acoustic energy received by the microphone.

9. The lighting apparatus of claim 1, wherein the structure comprises:
   electrical contacts for connecting to an external power source;
   a circuit board, at least the controller mounted on the circuit board;
   a shell that is attached to the base and contains the circuit board, the visible light source, and the acoustic energy detector, the shell allowing the 25 lumens or more of luminous flux from the visible light source to emerge from the shell and allowing acoustic energy from outside the shell to be received by the acoustic energy detector.

10. A method for detecting noise in a room, the method comprising:
   receiving acoustic energy at a lighting apparatus;
   analyzing the acoustic energy by performing speech recognition on the acoustic energy;
   determining that a human being caused the acoustic energy if a word is recognized;
   creating a message based on the recognized word; and
   sending the message from the lighting apparatus over a network in response to receiving the acoustic energy if the analysis determines that the acoustic energy was caused by the human being.

11. The method claim 10, wherein the analyzing of the acoustic energy further comprises:
   measuring an amplitude and a duration of the acoustic energy; and
   determining if the message should be sent based, at least in part, on the amplitude and the duration of the acoustic energy.

12. The method claim 10, wherein the analyzing of the acoustic energy further comprises:
   measuring frequency content of the acoustic energy; and
   determining if the message should be sent based, at least in part, on the frequency content of the acoustic energy.

13. A lighting fixture comprising:
   a socket with electrical contacts to accept a separate visible light source;
   a controller comprising a data transmitter;
   an acoustic energy detector with an output, wherein the output is communicatively coupled to the controller; and
   structure to couple the socket with the controller;
   wherein the controller is configured to:
      perform speech recognition on acoustic energy received by the acoustic energy detector;
      determine that a human being caused the acoustic energy if a word is recognized;
      create a message based on the recognized word;
      send the message through the data transmitter in response to the determination that the acoustic energy received by the acoustic energy detector was caused by the human being.

14. The lighting fixture of claim 13, wherein the data transmitter is communicatively coupled to an antenna and the data transmitter modulates a radio frequency carrier and the modulated carrier is transmitted from the antenna.

15. The lighting fixture of claim 14, wherein the data transmitter participates in a wireless mesh network.

16. The lighting fixture of claim 13, wherein the data transmitter modulates a carrier and the modulated carrier is coupled to a power line.

17. The lighting fixture of claim 13, wherein the controller further comprises circuitry to control an on-off state of electrical power to the electrical contacts of the socket.

18. The lighting fixture of claim 13, wherein the acoustic energy detector is a microphone, and the message comprises a representation of the acoustic energy received by the microphone.

19. The lighting fixture of claim 18, wherein said representation comprises a compressed rendition of the acoustic energy received by the microphone.

20. A light bulb comprising:
- at least one LED with a total combined visible light output of at least 25 lumens;
- a microphone having an output;
- a base with an electrical power connection;
- a shell connected to the base, the shell at least partially transparent to visible light, capable of allowing acoustic energy from outside the shell to be received by the microphone, and containing the at least one LED, the microphone and a controller; and
- the controller comprising:
  - (a) a processor;
  - (b) a radio frequency transceiver capable of connecting to a radio frequency network;
  - (c) circuitry configured to utilize commands received from the radio frequency network to control an on-off state of the at least one visible light LED;
  - (d) an input communicatively coupled to the output of the microphone; and
  - (e) a non-transitory processor readable storage medium, the non-transitory processor readable storage medium communicatively coupled to the processor and having processor readable program code suitable for execution on the processor embodied therewith, the processor readable program code comprising:
    - processor readable program code configured to receive data from the microphone representing acoustic energy received by the microphone;
    - processor readable program code configured to perform speech recognition on said data;
    - processor readable program code configured to create a message based on a recognized word; and
    - processor readable program code configured to send the message from the light bulb over the radio frequency network in response to receiving said data if at least one word is recognized.

21. The light bulb of claim 20 wherein said circuitry is further configured to utilize the commands received from the radio frequency network to control a color temperature of the total combined light output of the at least one visible light LED.

* * * * *